MAGNETIC STORAGE DEVICE AND SYSTEM

Filed June 22, 1961 2 Sheets-Sheet 1

INVENTOR
GEORGE D. BRUCE

BY Roger S. Smith

ATTORNEY

Oct. 19, 1965 G. D. BRUCE 3,213,435

MAGNETIC STORAGE DEVICE AND SYSTEM

Filed June 22, 1961 2 Sheets-Sheet 2

United States Patent Office 3,213,435

Patented Oct. 19, 1965

3,213,435

MAGNETIC STORAGE DEVICE AND SYSTEM

George D. Bruce, Poughkeepsie, N.Y., assignor to International Business Machines Corporation, New York, N.Y., a corporation of New York Filed June 22, 1961, Ser. No. 118,979
7 Claims. (Cl. 340—174)

Figure 1:
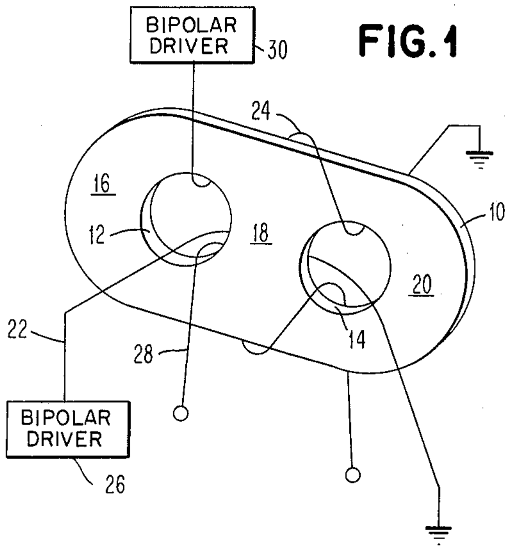

The present invention relates generally to information storage and logical switching devices and systems, and is directed in particular to devices and systems of this kind which make use of multistable static magnetic elements.

Static magnetic storage and switching devices are well-known in the information handling arts. A type of magnetic device currently receiving wide usage is the toroidal core composed of ferromagnetic material which exhibits a substantially rectangular hysteresis characteristic. Such an element is capable of storing binary information in terms of the direction of remanent flux established therein. The core is driven to one or the other of its two information representing states by controlled application of currents to windings coupled thereto. In the matrix storage systems in which these elements are commonly used coincident current switching techniques are employed to control individual elements or groups of elements in the array. Such techniques employ two or more drive windings on each magnetic element, these drive windings being connected in selection circuits along different coordinate axes of the matrix, and switching is accomplished by applying currents to more than one of these windings simultaneously.

In systems of this type, the driving currents must be accurately controlled. The sum of the forces created by the currents applied to the selected element must be sufficient to effect a change of state thereof, while the forces generated by the individual currents must be below the force necessary to switch an element, to prevent unwanted changes in non-selected elements coupled to the energized selection circuits. The elements employed in coincident current matrix systems must, therefore, exhibit a well-defined switching threshold to enable them to distinguish between the individual forces and the combination forces. In conventional systems, the combination force is no more than twice the individual force so the threshold must be between the amount of force necessary for switching, and half that value. These coincident current matrix systems thus impose critical limitations upon the cores as well as on the driving currents.

Logical switching systems employing magnetic elements commonly employ the same coincident current techniques as matrix memory systems and suffer the same limitations. For example, a gating circuit may employ a priming input of "half select" magnitude and an information input of the same value. When both are applied concurrently switching occurs, whereas either applied alone will not exceed the switching threshold.

The coincident current selection techniques mentioned above also impose limitations on the speed of operation of the magnetic elements in that the maximum current which may be applied to a selected element without disturbing unselected elements is limited.

According to the present invention a magnetic storage or switching element is provided which is not subject to the limitations mentioned above. The element comprises a body of magnetic material having a plurality of separate flux paths which share a common leg of restricted cross-sectional area. First input means, which may be considered as control means, are provided for rapidly switching the flux in the common leg. Second input means, which may be considered as information input means, are provided for controlling the distribution of flux between the paths sharing the common leg. Under control of the second means a plurality of distinctly different flux distribution patterns may be obtained, each of which will persist indefinitely after the inputs are removed. These flux patterns represent different stable states of the element and may be employed to represent stored information.

This element enjoys advantages over the prior art devices in that it does not depend upon any switching threshold for its operation, nor does it require the close regulation of driving currents necessary for controlling the prior art devices. Moreover, driving forces several times the coercive force of the magnetic material may be supplied by the common leg switching means to attain switching speeds much higher than previously possible. Also, since the balance of the energy required to switch the common leg flux is supplied by a single control means and since the information input means merely effects a desired distribution of this flux, the element is responsive to very low level information inputs.

Accordingly, it is an object of this invention to provide a magnetic element which is responsive to different combinational excitations to attain different stable states but which does not depend upon any switching threshold characteristic for its operation.

Another object of the invention is to provide a magnetic element which is responsive to different combinational excitations to attain different stable states, but which does not require close regulation of input excitation levels.

Still another object of the invention is to provide a magnetic element of the type described wherein one of the combinational excitations is of a level well above the switching threshold of the device to produce high speed operation.

It is also an object of the invention to provide an element of the type described wherein one of the combinational excitations may be of an extremely low level.

Stated somewhat differently, it is an object of this invention to provide a magnetic device in which a low level information input is employed to control magnetic flux switched by a high level input to produce any of a plurality of distinctly different stable magnetic states.

An important characteristic of the element is that with the excitation means employed it cannot be directly changed from one of its information representing states to another information representing state. Once in an information representing state, it is insensitive to further information entering excitations. In order to change the value of information stored, it is first necessary to establish the element in what may be termed a reset or non-information representing state and then drive it to the new information representing state. This characteristic is employed in the present invention to provide a matrix memory system which does not require coincidence of selectable coordinate excitation means to perform an information entering or "writing" operation. While the writing operation requires coincidence of two input excitations, only one of the excitations need be supplied by a selectable coordinate means, the other being unconditionally applied to all elements in the coordinate array. It will be appreciated that this feature of the invention offers substantial advantages in address simplification, timing tolerances, etc. over conventional matrix memory systems.

Accordingly it is also an object of the present invention to provide a magnetic matrix memory wherein entry of information in predetermined cells does not require coincidence of selectable coordinate excitation means.

Another object of the invention is to provide a matrix memory wherein the selection of cells for storage is accomplished by a resetting or reading out operation performed prior to the storing operation.

Still another object of the invention is to provide a matrix memory wherein one of two coincident wiring excitations is applied unconditionally to all elements of an array.

Another object of the invention is to provide a magnetic element having at least two information holding states and a non-information holding state together with means for establishing the element in either information holding state, said means being ineffective to produce a change of state of said element when it occupies either of the two information holding states.

The foregoing and other objects, features and advantages of the invention will be apparent from the following more particular description of preferred embodiments of the invention, as illustrated in the accompanying drawings.

Figure 3:
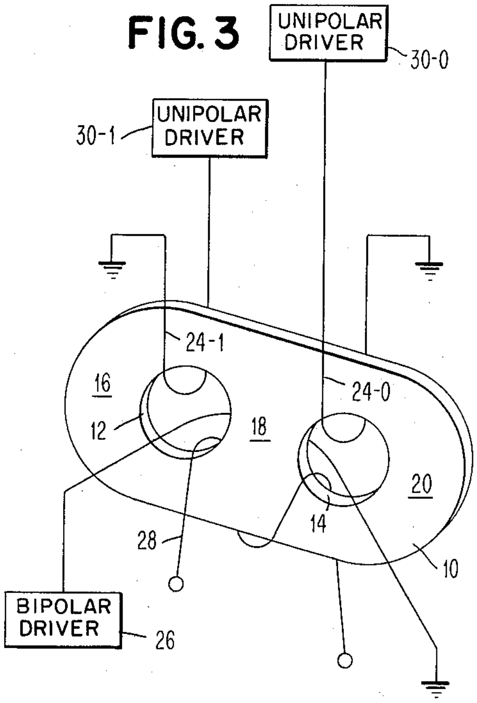
Figure 2A:
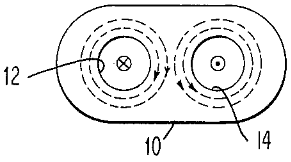
Figure 4A:
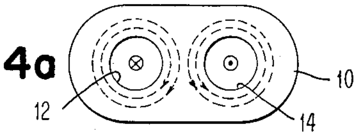
Figure 2B:
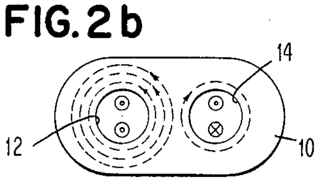
Figure 4B:
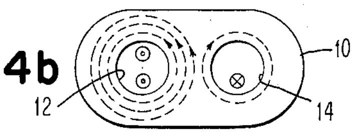
Figure 4C:
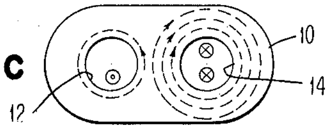
Figure 2C:
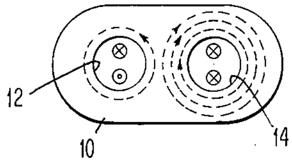
Figure 5:
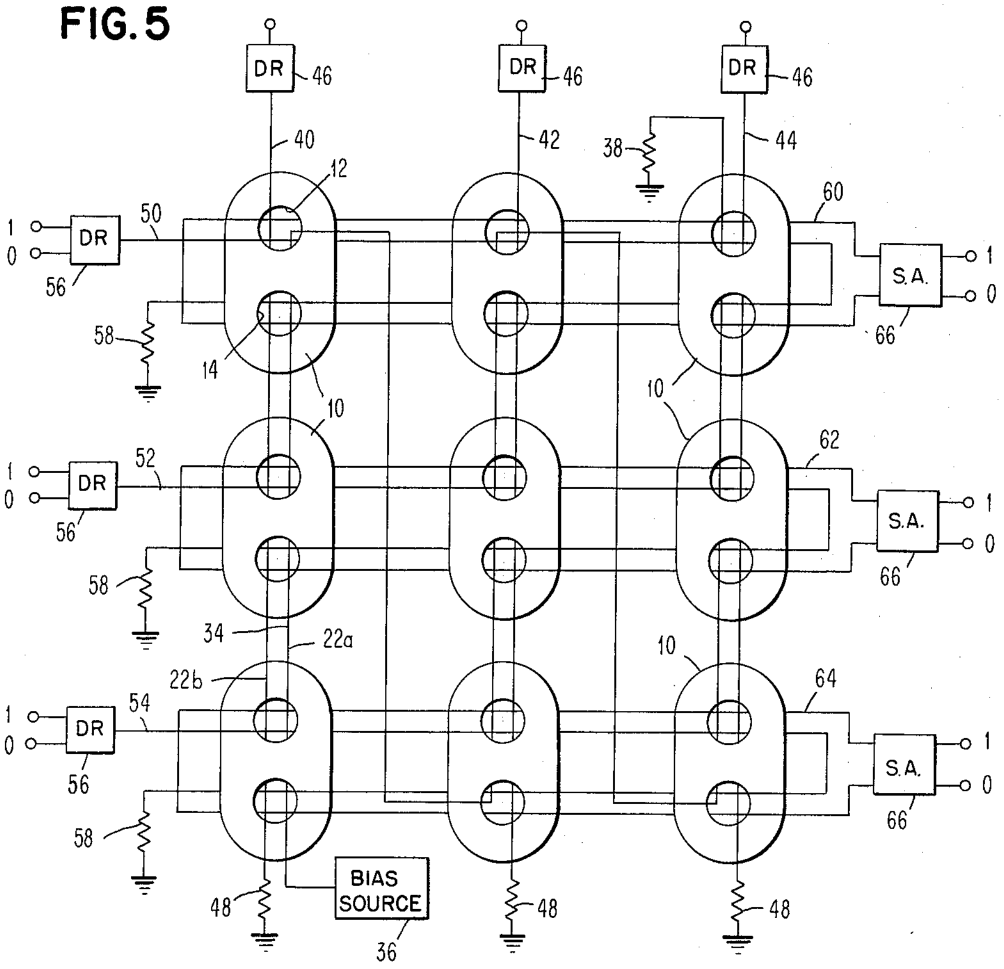
Figure 6:
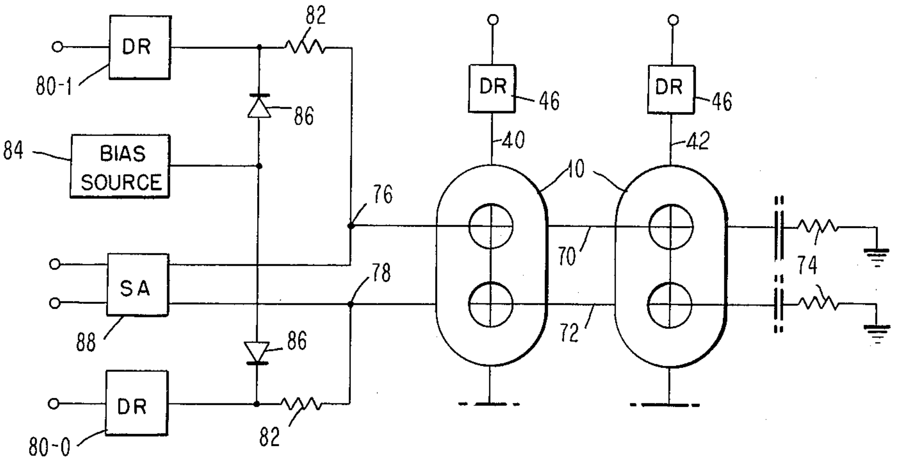

In the drawings:

FIGURE 1 is a perspective illustration of a magnetic element provided in accordance with this invention;

FIGURES 2*a*, 2*b* and 2*c* depict various flux configurations which may be established in the device of FIGURE 1;

FIGURE 3 is a perspective illustration of a modified form of the invention;

FIGURES 4*a*, 4*b* and 4*c* depict various flux configurations which may be established in the device of FIGURE 3;

FIGURE 5 is a schematic illustration of a memory matrix embodying the present invention; and FIGURE 6 is a fragmentary schematic illustration of a modified form of a memory matrix embodying the invention.

Referring now in detail to the drawings, there is shown in FIGURE 1 a magnetic element 10 provided in accordance with the invention. The element 10 is fabricated from magnetic material, for example, a manganese-zinc ferrite, which exhibits appreciable magnetic remanence. The material need not be a so-called "square loop" ferrite and preferably has a low coercive force so that relatively small magnetizing fields may be employed to alter its magnetic condition. Two spaced apart apertures 12 and 14 are provided in the element 10 dividing it into three separate vertical legs 16, 18 and 20. A first winding 22 is threaded through the apertures 12 and 14, respectively, in opposite directions to control the magnetic flux in the center leg 18. A second winding 24 is threaded through the apertures 12 and 14 both in the same direction to control thhe magnetic flux in legs 16 and 20.

The first winding 22 provides an input for switching magnetic flux in the center leg 18 of the element 10 in either of two directions of saturation, and is adapted to carry current of intensity sufficient to produce a field in the leg 18 considerably higher than the coercive force of the material, so that rapid saturation of the leg 18 will be attained. A bipolar driver 26 connected to winding 22 provides selectively operable means for passing current pulses therethrough in either direction. The details of the driver 26 and the controls for operating it are not disclosed herein since they are old and well-known in the art. In the absence of any other fields, the flux produced in leg 18 by the current in winding 22 will divide equally between the other legs 16 and 20 to produce equal flux loops around apertures 12 and 14, one in a clockwise direction and one in a counter-clockwise direction. FIGURE 2*a* illustrates the division of flux around apertures 12 and 14 in the case where current is passed through winding 22 from driver 26 to reference potential. The current direction symbol "⊗" shown at the center of aperture 12 in FIGURE 2*a* indicate passage of current therethrough into the plane of the paper. The symbol "⊙" in the aperture 14 indicates passage of current therethrough out of the plane of the paper. The four arrows shown passing downwardly through the center leg of the element in FIGURE 2*a* may be taken as representing lines of flux. For the purposes of this description, it will be assumed that four arrows passing through the center leg are sufficient to saturate that leg. Application of current to winding 22 in the direction shown in FIGURE 2*a* thus saturates the center leg 18 of element 10 in a downward direction, and, in the absence of any other magnetic fields, creates equal flux loops about both apertures 12 and 14. Application of current to wire 22 in the opposite direction will create a flux pattern which is the reverse of that shown in FIGURE 2*a*.

The second winding 24 on the element 10 provides an input for effectively steering the center leg flux switched by winding 22 around one or the other of the apertures 12 and 14 in accordance with the polarity of the current applied thereto by its associated bipolar driver 30. Since winding 24 is threaded through one of the apertures in the same direction as winding 22 and through the other aperture in the opposite direction, for any combination of current polarities in windings 22 and 24, the field produced by winding 24 aids the field of winding 22 in one of the legs 16 or 20 and opposes it in the other to create a more favorable path for the center leg flux around one aperture than around the other. Assume, for example, that current is established through winding 22 from reference potential to the driver 26, and at the same time current is established through winding 24 from reference potential to its driver 30. Under these conditions, the flux pattern of FIGURE 2*b* is created. The field produced in center leg 18 by winding 22 switches the flux upwardly therein so that it would normally divided and encircle aperture 12 in a counter-clockwise direction and aperture 14 in a clockwise direction. Winding 24 produces a downward field in leg 16 to aid the counter-clockwise flux around aperture 12, but it produces an upward field in leg 20 to oppose the clockwise flux around aperture 14. Under these conditions, the upwardly directed flux in center leg 14 will find a more favorable path around aperture 12 than around aperture 14 and the major part of this flux will be directed around that aperture, leaving only a small amount of flux around aperture 14, as shown in FIGURE 2*b*. Establishment of a major flux path about aperture 14 instead of aperture 12 may be obtained by applying current to winding 24 in the opposite direction at the time center leg 18 is switched by current in winding 22, as shown in FIGURE 2*c*.

From one standpoint the phenomenon just described may be thought of as a flux steering operation. The field created by current in winding 22 switches the center leg 18 from one saturation condition to the other, and the fields created by current in winding 24 steer this flux for the most part around one or the other of the paths around apertures 12 and 14.

From another standpoint, the unequal division of flux around apertures 12 and 14 may be explained as the result of a difference in switching rates around two paths sharing a common leg. It is known that the rate at which flux may be switched in a magnetic circuit is proportional to the magnetic field applied. Therefore, if unequal fields are created around apertures 12 and 14 due to current through windings 22 and 24, flux switch more rapidly around one aperture than around the other, so that when the common leg 18 reaches saturation, a higher percentage of the flux therein will be stored around one aperture than around the other.

It has been found that significant unbalances in the flux stored around the apertures 12 and 14 may be attained with a very small control current through winding 24. The current supplied by driver 30 to winding 24 is preferably well below the magnitude required to switch flux around a path encircling both the apertures 12 and 14 so that, if applied alone, it does not affect the element 10. Currents below the value required to produce switching around either aperture are sufficient to produce the desired flux distribution.

It will be appreciated from the foregoing that the element 10 is capable of very high speed operation since the critical portion thereof, the center leg 18, may be substantially overdriven through winding 22 without affecting the ability to set the device in either of the two states of FIGURES 2*b* and 2*c* under control of a small current in winding 24. Extremely high speeds may be attained by reducing the cross-sectional area of the leg 18 to concentrate the force applied via winding 22. While the leg 18 is shown in the drawings as being of about the same width as the legs 16 and 20, it is not intended that the invention be limited to this relation. To permit an unequal division of flux around apertures 12 and 14 with the leg 18 saturated it is only necessary that the center leg 18 be significantly less than twice the width of either of the legs 16 or 20. The leg 18 is preferably limited to about the same cross-sectional area as that of the legs 16 and 20, so that neither of the legs 16 nor 20 saturate before the leg 18 when the device is being driven to one of the states of FIGURES 2*b* and 2*c*. As mentioned above, the legs 18 may be made much narrower than the legs 16 and 20 to increase the speed of the element 10. If the element is constructed so that neither of the legs 16 nor 20 is saturated at any time, an advantage in heat minimization is atained, since the portions of the element 10 which are not overdriven or saturated act as a heat sink for the center leg 18.

It will be apparent to those skilled in the art that the element just described is well adapted for use as an information storage device. The two flux configurations shown in FIGURES 2*b* and 2*c*, respectively, may be employed to represent stored binary values, while the flux configuration of FIGURE 2*a* may be considered as a reference or non-information holding state. Information stored in the device in terms of the remanent flux patterns shown in FIGURES 2*b* and 2*c* may be retrieved or read out of the device by driving it to the reference state of FIGURES 2*a*, by application of current to the winding 22 in a direction to switch the center downward, and sensing the voltage induced in a sensing winding 28. The winding 28 is coupled to the element in the same manner as winding 24. When the element 10 is driven from one of the states of FIGURE 2*b* or 2*c* to the state of FIGURE 2*a*, opposing voltages are induced in the winding 28, of magnitudes which are proportional to the amount of flux being reversed. The winding 28 differences these voltages to produce a net difference signal the polarity of which is determined by which of the patterns of FIGURE 2*b* or 2*c* was formerly stored in the element. This net difference signal may be applied to a known polarity responsive means, through a suitable known sense amplifier to provide a detectable indication of the information read from the element.

FIGURE 3 of the drawings shows a slightly modified form of the invention wherein two separate information input windings 24–1 and 24–0 are coupled to the element 10 in place of the single winding 24 of FIGURE 1 and separate unipolar drivers 30–1 and 30–0 are provided to energize these windings. Except for this difference, the embodiment of FIGURE 3 is identical to that of FIGURE 1, and like reference characters are employed to indicate like elements. With this embodiment of the invention, the reference or non-information representing state shown in FIGURE 4*a* is obtained, as in the case of the embodiment of FIGURE 1, by energizing the winding 22 with current flowing into the aperture 12 and out of the aperture 14 to saturate the leg 18 downwardly. The patterns of FIGURES 4*b* and 4*c* are obtained by energizing the bipolar driver 26 in the opposite direction, and by coincidently energizing one of the drivers 30–1 or 30–0 to pass current through one of the windings 24–1 or 24–0 from its driver to reference potential. As in the case of the device of FIGURE 1, the field created in the center leg 18 by current in winding 22 rapidly switches the flux therein upwardly, while the field created by the energized one of windings 24–1 or 24–0 creates an unbalanced condition making one of the paths around apertures 12 and 14 more favorable than the other. For example, to obtain the pattern of FIGURE 4*b*, current is passed through winding 22 into aperture 14 and out of aperture 12, as indicated by the lower set of current direction symbols in FIGURE 4*b*, and current is simultaneously passed through winding 24–1 out of aperture 12, as indicated by the upper current direction symbol in aperture 12. The field created by current in winding 24–1 makes the path around aperture 12 more favorable to the flux switched upwardly in leg 18 than the other path and a majority of the flux is established in this more favorable path.

To obtain the pattern of FIGURE 4*c*, driver 30–0 is activated instead of driver 30–1 so that the path around aperture 14 is more favorable than that around aperture 12.

It will be seen that the device of FIGURE 3 operates in essentially the same manner as the device of FIGURE 1 with the exception that unipolar information input drivers may be employed in place of a bipolar information input driver. Since in this embodiment of the invention, a desired path is selected only by application of an aiding field thereto, rather than by application of an aiding field to one path and an opposing field to the other path, it is desirable to employ somewhat higher current values in the information input windings to insure a good unbalance. The fields created by the energized windings 24–1 and 24–0 may, however, still be well below the switching threshold of a path around both apertures.

While not specifically shown in the drawings, it will be apparent that the device of FIGURE 3 may be operated with information input signals which create unbalance by application of an opposing field to the non-selected flux path, rather than by application of an aiding field to the selected path. This mode of operation is somewhat slower than the mode employed in FIGURE 3.

The magnetic element provided in accordance with the present invention exhibits the important characteristic that once placed in either of its information holding states of FIGURES 2*b* and 2*c* (or FIGURES 4*b* and 4*c*) it is substantially insensitive to further applications of normal driving currents to the winding 22 in the same direction, or to further applications of normal driving currents to the winding 24 (or windings 24–1 and 24–0) in either direction. Thus, once the element is placed in a selected information state, it can only be driven to a different information state by first establishing it in the non-information holding state and then driving it to the new information state. This characteristic exists because of the fact that when the device is in either of its information states, the center leg 18 is saturated in the same direction. Once this leg is saturated, continued or repeated applications of normal current to winding 22 cannot change any appreciable flux therein. The fields produced by the information input winding 24 of FIGURE 1 (or the windings 24–1 and 24–0 of FIGURE 3) are below the switching threshold of a path encircling both apertures so they cannot affect the flux pattern.

This important characteristic of the element is utilized in the matrix memory system of FIGURE 5 to provide a word oriented matrix memory that does not depend upon coincidence of coordinate energizing means to perform either a reading or writing operation.

The memory matrix 32 of FIGURE 5 comprises a plurality of elements 10 arrayed in rows and columns. In the interest of simplicity only three rows and three columns are shown. It will be understood, of course, that any number of rows and columns may be provided. Each column represents a different word storage register, and each row represents a different bit storage position common to all registers. Each of the elements 10 is provided with two identical control input windings, identified on the lower left hand element of the matrix as 22*a* and 22*b*. The windings 22*a* of all elements of the matrix 10 are connected in series aiding to form a bias coil 34. The coil 34 is connected at one end to a bias current source 36, and at the other end to reference potential through a suitable impedance 38. The bias current source is arranged to provide a constant current in coil 34 from source 36 to reference potential of sufficient intensity to saturate the center legs 18 of all elements 10 with flux directed from left to right.

The windings 22*b* of all elements of each separate column of the matrix 32 are connected in series aiding to form column read coils 40, 42 and 44. Each coil 40, 42, 44 is connected, at its upper end to a unipolar word read driver 46 and at its lower end to reference potential through a suitable terminating impedance 48. The drivers 46 are arranged to provide, when activated, current from the driver to the reference potential of sufficiently high intensity to overcome the bias field and switch the center legs 18 of the elements 10 in the associated column to saturation with flux directed toward the left.

The information inputs for the elements 10 of each row are provided by coils 50, 52 and 54. Each coil 50, 52, 54 is threaded in series through the apertures 12 of all elements of a row, and then in the same sense through the apertures 14 of these cores. Examination of these windings will show that the relation of each with any core is the same as that of the winding 24 of FIGURE 1. Each coil 50, 52, 54 is connected at one end to a bipolar information input driver 56 and at the other end to reference potential through a terminating impedance 58. Each driver has two activating control lines labeled 1 and 0. The control line activates the driver in a sense to produce current from reference potential to the driver 56, while the control line 0 activates the driver in a sense to produce current from the driver to reference potential. The magnitude of the current produced by the drivers 56 is below the level required to switch flux in the associated elements 10 around a path encircling both apertures as mentioned earlier herein, but is sufficient when combined with the field of the bias coil 34, to create the required unbalance to produce the patterns shown in FIGURES 2*b* and 2*c*.

In addition to the drive windings just described, each row of elements 10 has coupled thereto a sense coil 60, 62 or 64 wherein voltages are induced upon read-out of the storage registers. As may be seen in FIGURE 5, the sense coils 60, 62, 64 are coupled to the elements in the same manner as the information input coils 50, 52, 54. Each sense coil is connected to an amplifier 66 of a type capable of amplifying signals of either polarity and of providing outputs indicative of the polarity of the signal received. Each amplifier is shown as having output lines 1 and 0, one of which is energized when a signal of one polarity is processed by the amplifier and the other of which is energized when a signal of the opposite polarity is processed. Amplifiers of the type just described are known in the art so it is not believed necessary to describe their details herein.

It is believed that the memory unit shown in FIGURE 5 may best be understood by consideration of a specific example of operation thereof. Let it be assumed that each storage register (column) has been previously filled so that each element 10 in the matrix is in one or the other of the stable states shown in FIGURES 2*b* and 2*C*. Let it further be assumed that the particular information stored in the left hand column is the binary word "101." The upper and lower elements in the leftmost column store a 1 in terms of a concentration of flux in the counter-clockwise direction around aperture 12 thereof (see FIGURE 2*b*). The middle element 10 of this column stores a 0 in terms of a concentration of clockwise flux around aperture 14 (see FIGURE 2*c*). Let it be assumed that the operation to be carried out is a read-regenerate cycle wherein the word "101" is read out of the left hand column and then rerecorded in the same location.

Read-out of the information is accomplished by activating the read driver 46 of column coil 40 by any conventional read-addressing means (not shown). When activated driver 46 applies current to coil 40 to generate a field in the center legs 18 of all elements 10 of the associated column. This field is of sufficient intensity to overcome the field of bias coil 34 and to switch the center leg flux in each element to saturation toward the left, establishing each of the associated elements in the state of FIGURE 2*a*. As the elements are switched, voltages are induced in the several sense coils 60, 62 and 64. As previously described, the voltages induced in the sense coil portions passing through apertures 12 oppose those generated in the coil portions threading apertures 14. In the case of each of the upper and lower elements, the voltage induced by the flux reversal around aperture 12 exceeds that of aperture 14 and a net difference signal of one polarity exists. The sense lines 60 and 64 present their respective signals to the associated amplifiers 66 which respond with outputs on the output lines 1. In the case of the middle element, the voltage induced by flux reversal about aperture 14 is the largest so a net difference signal of the opposite polarity is presented by coil 62 to its amplifier. The amplifier associated with coil 62 responds with a signal on its output line 0. The data word "101" is thus read out.

The data just read out is regenerated in the same elements by activating the drivers 56 of input coils 50, 52 and 56 in the proper sense. Known circuitry (not shown) is employed to apply the information bits detected by the sense amplifier to the controls of drivers 56. During the period of detection and transmission of these signals to drivers 56, the read driver 46 is held on to maintain the elements 10 in their non-information holding states. When the writing operation is to be performed the read driver 46 of the left hand column is turned off, and the bias coil 34 switches the center legs 18 of the three elements 10 back to saturation toward the right. At the same time, the information input drivers are activated to apply currents to coils 50, 52 and 54 to steer the flux switched by the bias coil around the desired paths in accordance with the information being stored. The drivers 56 of coils 50 and 54 are energized to pass current from reference potential to the drivers while the driver of coil 52 is energized in the opposite sense to record the word "101".

During the writing operation each element 10 in a given row is receiving the same fields from the bias coil 34 and the associated information input coil 50, 52 or 54. However, due to the characteristic described earlier, only the element 10 which was reset during the previous readout operation is sensitive to these fields. The remaining elements, not having been sensitized by read currents from their associated column coils, are unaffected by these writing fields.

It will be understood by those skilled in the art that the bias winding 34 need not be continuously energized. Since it performs no useful function during read time, means may be provided for de-energizing it during this period, and for energizing it coincidently with energization of the information entry coils 50, 52 and 54.

In FIGURE 6 of the drawings there is shown a fragmentary schematic illustration of a memory matrix employing winding sharing techniques to reduce the number of windings coupling each element 10. In this embodiment, the column read circuitry including read coils 40 and 42 and drivers 46 is identical to that of FIGURE 5. The biasing, writing and sensing circuitry is modified to permit the common use of a pair of coils 70 and 72 for each of these functions. As may be seen from FIGURE 6, the coil 70 threads the aperture 12 of each element of the same row serially in one sense while the coil 72 threads the aperture 14 of each element of the same row serially in the opposite sense. The coils 70 and 72 are terminated to reference potential through impedances 74 at the right hand end of the row, and are connected to terminal points 76 and 78 at the left end of the row.

Unipolar information input drivers 80–1 and 80–0 are coupled to terminal points 76 and 78, respectively, through impedance elements 82. The coils 70 and 72 and the drivers 80–1 and 80–0 will be recognized as the equivalents of windings 24–1, 24–0 and drivers 30–1, 30–0 of FIGURE 3. A bias source 84 is also connected to each of the terminal points 76 and 78 through diodes 86 and through the impedance elements 82. The bias source is arranged to deliver a constant current through each of the coils 70 and 72 to reference potential of magnitude sufficient to saturate the center legs 18 of the elements 10 as in the embodiment of FIGURE 5.

A sense amplifier 88, which may be the same as the amplifiers of FIGURE 5, is connected across the terminal points 76 and 78 to sense voltages generated therein. Examination of FIGURE 6 will show that the arrangement of the coils 70 and 72 is such that signals induced therein during changes of an element 10 from either of the information holding states to the reset state will be presented at terminals 76 and 78 as a net difference signal the polarity of which is dependent upon which of the apertures 12 or 14 of the element experienced the greatest flux change.

The arrangement of FIGURE 6 is operated in the same "non-coincident" mode as the embodiment of FIGURE 5. And with the same results. The primary advantage of this embodiment lies in the fact that fewer windings are required on each element, so that manufacturing ease and cost reduction may be achieved.

While not specifically shown in the drawings, it will be apparent that the elements 10 may be provided in three-dimensional arrays if desired. In such a configuration, it would be necessary to replace the single read coils with two half select read windings coupled to the elements along intersecting coordinates in standard three dimensional fashion. The information input coils, bias coils and sense coils would remain unchanged, with the exception that each information input coil and each sense coil would serve an entire plane of elements rather than a single row. A single bias coil might be employed for the entire array, or a separate bias coil might be provided for each plane, if desired.

The memory matrices shown and described herein employ separate magnetic elements 10. It will be appreciated that a matrix may be provided in the form of a ferrite plate having spaced pairs of apertures which form the equivalent of the elements 10, provided the spacing of hole pairs is great enough to prevent interaction.

The magnetic element 10 described herein is not restricted to use as a memory element. As pointed out earlier, it may be employed for switching and gating functions as well. Since the device responds to very small information inputs, it is particularly useful as a detector or gate for low level input pulses.

While the invention has been particularly shown and described with references to preferred embodiments thereof, it will be understood by those skilled in the art that various changs in form and details may be made therein without departing from the spirit and scope of the invention.

What is claimed is:

1. A memory array comprising a plurality of storage registers each including a plurality of bit storage cells, each said cell comprising a magnetic body having a pair of spaced apertures defining a common leg therebetween, the width of said common leg being substantially less than twice the distance from either aperture to the nearest bounding edge of the body, each said cell having a non-information representing state wherein the common leg is saturated with flux in one direction and wherein said common leg flux encircles the two apertures in substantially equal amounts, each said cell having two information representing states wherein the common leg is saturated in the opposite direction and substantially more than half of the common leg flux encircles a predetermined one of said apertures, a plurality of selectively operable reading means each associated with a different register and operable during a read time interval to apply a read control excitation to the common leg of each cell of the associated register to saturate it in said one direction, thereby establishing all of the cells of said associated register in the non-information representing state, write control means operable at least during a write time interval for applying a write control excitation to the common leg of each cell of every register in a direction to saturate it with flux in said opposite direction, and a plurality of selectively operable information entry means each associated with a single corresponding cell of each register, each said information entry means being operable during said write time interval to apply an information representing excitation to each of the associated cells in a manner to cause more than half of the common leg flux to encircle a predetermined one of the two apertures of the cell, said write control means and said information entry means being effective to produce a change of state only in cells which occupy the non-information representing state.

2. A memory array comprising a plurality of storage registers each including a plurality of bit storage cells, each said cell comprising a magnetic body exhibiting substantial remanence having a pair of spaced apertures defining a common leg therebetween, the width of said common leg being substantially less than twice the distance from either aperture to the nearest bounding edge of the body, each said cell having a non-information representing state wherein the common leg is saturated with flux in one direction and wherein said common leg flux encircles the two apertures in substantially equal amounts, each said cell having two information representing states wherein the common leg is saturated in the opposite direction and substantially more than half of the common leg flux encircles a predetermined one of said apertures, a plurality of selectively operable reading means each associated with a different register and operable during a read time interval to apply a read control excitation to the common leg of each cell of the associated register to saturate it in said one direction, thereby establishing all of the cells of said associated register in the non-information representing state, a plurality of separate sensing means each including winding portions threading the apertures of a single corresponding cell of each storage register wherein a voltage of one or another polarity is induced upon change of any associated cell from an information representing state to the non-information representing state, the polarity of said voltage indicating from which of the information holding states the cell was changed, write control means operable at least during a write time interval for applying a write control excitation to the common leg of each cell of every register in a direction to saturate it with flux in said opposite direction, and a plurality of selectively operable information entry means each associated with a single corresponding cell of each register, each said information entry means being operable during said write time interval to apply an information representing excitation to each of the associated cells in a manner to cause more than half of the common leg flux to encircle a predetermined one of the two apertures of the cell, said write control means and said information entry means being effective to produce a change of state only in cells which occupy the non-information representing state.

3. A storage device having a non-information representing state and a pair of distinctly different information representing states, changeable during a read control excitation from either of the pair of distinctly different information representing states to the non-information representing state, comprising:

(a) a body of magnetic material exhibiting substantial remanence, said body defining two spaced apart apertures separated by a center leg, the width of which center leg is substantially less than twice the distance from either aperture to the nearest bounding edge of the body;

(b) read-write driver means for providing selectively a polarized read-drive pulse and a second, oppositely polarized, write pulse;

(c) read-write winding means, connected to said read-write driver means, threaded through both of said apertures in opposite sense to form at least a coil coupling said center leg whereby flux is selectively switchable to saturation within said center leg in a first direction by the read pulse and in a second direction by the write pulse;

(d) data entry driver means for providing selectively a polarized 1 bit pulse and an oppositely polarized 0 bit pulse;

(e) data entry winding means, connected to said data entry driver means, threaded through said body within each of the two apertures, with at least one turn through each aperture, for causing substantially more than half the flux switched in the center leg of said body of bistable magnetic material to encircle a predetermined one of said apertures; and (f) sensing means effective upon occurrence of a read drive pulse in said read-write driver means (b) for determining which aperture more than half the flux in the center leg encircles.

4. A memory storage device according to claim 3, wherein said body (a) is dimensioned such that the width of its center leg is no greater than the distance from either aperture to the nearest peripheral edge.

5. A memory storage device according to claim 3, wherein said data entry winding means is a winding threaded serially through both apertures of said body in the same sense, with at least one turn through each aperture.

6. A memory storage device according to claim 3, wherein said data entry winding means is a separate winding threaded through each aperture of said body with at least one turn.

7. A memory array according to claim 2, wherein said write control means continuously applies a write control excitation and wherein each said reading means is operable to overcome the write control excitation during the read time interval.

References Cited by the Examiner

UNITED STATES PATENTS

| | | | |
|---|---|---|---|
| 2,685,653 | 8/54 | Orr | 307—88 |
| 3,007,141 | 10/61 | Rising | 340—174 |
| 3,040,305 | 6/62 | Gianola | 340—174 |

IRVING L. SRAGOW, *Primary Examiner.*